(12) United States Patent
Ottesen

(10) Patent No.: US 6,873,744 B2
(45) Date of Patent: Mar. 29, 2005

(54) IMAGE RESTORATION FROM TRANSFORMED COMPONENT DATA

(75) Inventor: Hal H. Ottesen, Rochester, MN (US)

(73) Assignee: Regents of the University of Minnesota, Minneapolis, MN (US)

( * ) Notice: Subject to any disclaimer, the term of this patent is extended or adjusted under 35 U.S.C. 154(b) by 0 days.

(21) Appl. No.: 10/124,547

(22) Filed: Apr. 17, 2002

(65) Prior Publication Data

US 2003/0198403 A1 Oct. 23, 2003

(51) Int. Cl.[7] ................................................. G06K 9/36
(52) U.S. Cl. ...................................... 382/280; 382/276
(58) Field of Search ................................. 382/276, 280, 382/128, 131, 132, 302, 100; 380/232, 54, 28, 31, 38; 250/228; 156/378; 358/475; 709/219

(56) References Cited

U.S. PATENT DOCUMENTS

| | | | | |
|---|---|---|---|---|
| 5,825,892 A | * | 10/1998 | Braudaway et al. | ........ 382/100 |
| 6,178,271 B1 | * | 1/2001 | Mass, III | ..................... 382/294 |
| 6,195,465 B1 | * | 2/2001 | Zandi et al. | ................ 382/248 |
| 6,427,028 B1 | * | 7/2002 | Donescu et al. | ............ 382/243 |
| 6,535,614 B1 | * | 3/2003 | Kimura et al. | .............. 382/100 |
| 6,625,297 B1 | * | 9/2003 | Bradley | ...................... 382/100 |

\* cited by examiner

Primary Examiner—Yon J. Couso
(74) Attorney, Agent, or Firm—Schwegman, Lundberg, Woessner & Kluth, P.A.

(57) ABSTRACT

An image in a base domain (e.g., spatial) is restored from only one component (e.g., magnitude) of a transform-domain (e.g., Fourier) image by combining this component with a complementary component (e.g., phase) of a transformed previous iteration. Every iteration is converted to the base domain, and predefined known marker and padding data is reapplied to the iteration during every iteration, for convergence purposes. The restored image can be scaled and trimmed, and the marker position interpolated. The original image to be restored is modified to contain the known marker and known padding at known locations. These may be inserted in the base domain or in the transform domain.

138 Claims, 5 Drawing Sheets

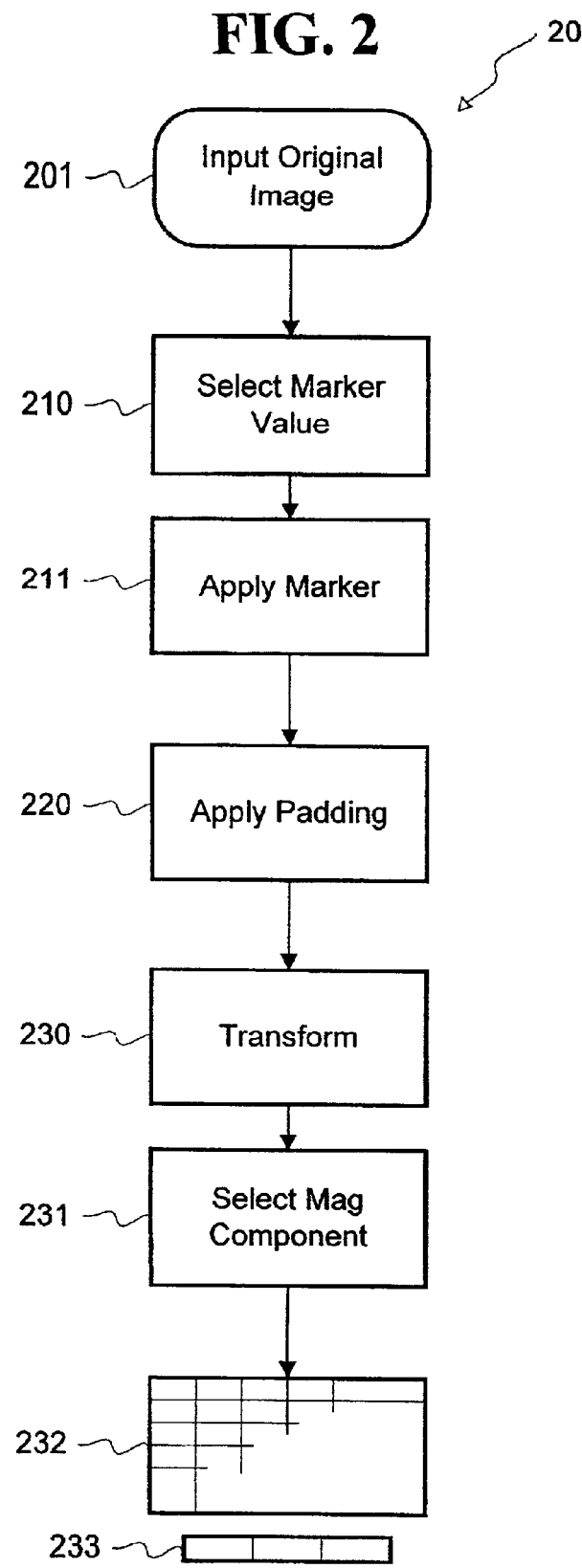
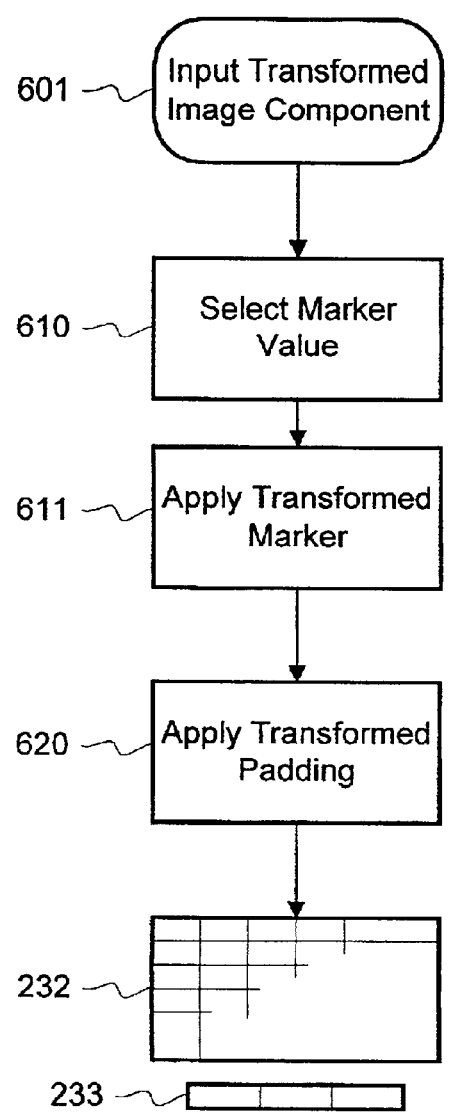

Image Restoration From Transformed Component Data

TECHNICAL FIELD

The present invention relates to image data processing, and more particularly concerns restoring an image from a transformed version including less than all components of the transformed data.

BACKGROUND

Digitized images frequently require large amounts of data. Medical imaging, for instance, often produces huge volumes of data to be stored or communicated to another location. Personal-computer disk drives increasingly store photographs and scenics for realistic games. Burgeoning security applications promise to require increasing amounts of image data for biometric scanning. Transmitting only part of the data from an image would substantially reduce bandwidth and time requirements for communicating images or other large data sequences, and would slash storage volume for recording such images.

Moreover, images might be produced only as a magnitude or power component of frequency transformed data. Some astronomical and weather data fall into this category. Other applications may severely distort the phase or magnitude component of a transformed image, leaving reliable data only in the complementary magnitude or phase component. Blind convolution, for example, attempts to restore data from an unknown signal convolved with noise or filtered through an unknown system.

Using the Fourier transform of a spatial image as a paradigm, the magnitude component of the transform contains half the information of the image from the spatial base domain, and the complementary phase component contains the other half. The ability to restore or reconstruct an image from only one of these frequency components could save the bandwidth and/or time required to transmit both components, or to transmit the image in its spatial or other base-domain form. Storing only a single transform component would also substantially reduce the space required to hold a representation of a transform-domain image on a disk or other medium. These reductions are especially significant in the normal case where transform-domain data requires a double-precision floating-point format.

However, those in the art currently regard adequate restoration or reconstruction from only one component of the transform domain as an open problem. Techniques do exist for certain specialized cases or for images having particular constraints. Some known techniques require initial estimates close to the final image. Others lead to non-unique solutions. When the conditions fail, conventional iterative procedures often wander about the solution space without converging to a unique answer. Sometimes even determining whether or not the proper conditions obtain is difficult.

SUMMARY

The present invention offers an iterative technique for restoring or reconstructing an image, given only a component of the data from a transformed version of the original image and one or more known marker values. The transformed image component is combined with a complementary component of the current restored image for multiple iterations. During each iteration, the known marker(s) are reinserted into the current restored image to enhance convergence. The invention also includes a technique for marking an original image in a way that the restoring technique converges without imposing any special constraints upon the original image.

THE DRAWING

FIG. 2 shows a method for preparing image data of FIG. 1 for restoration.

Figure 3A:
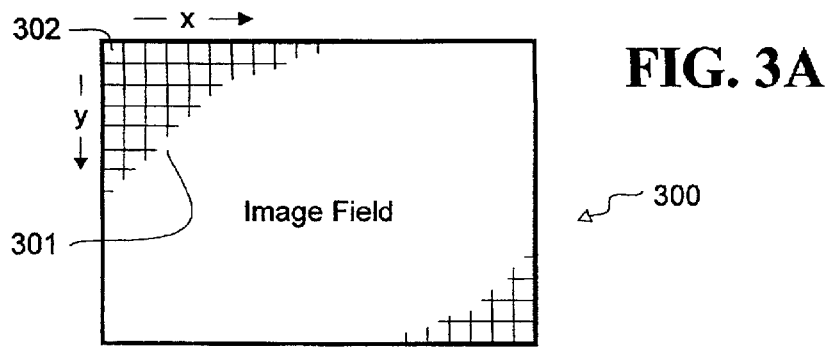
Figure 3B:
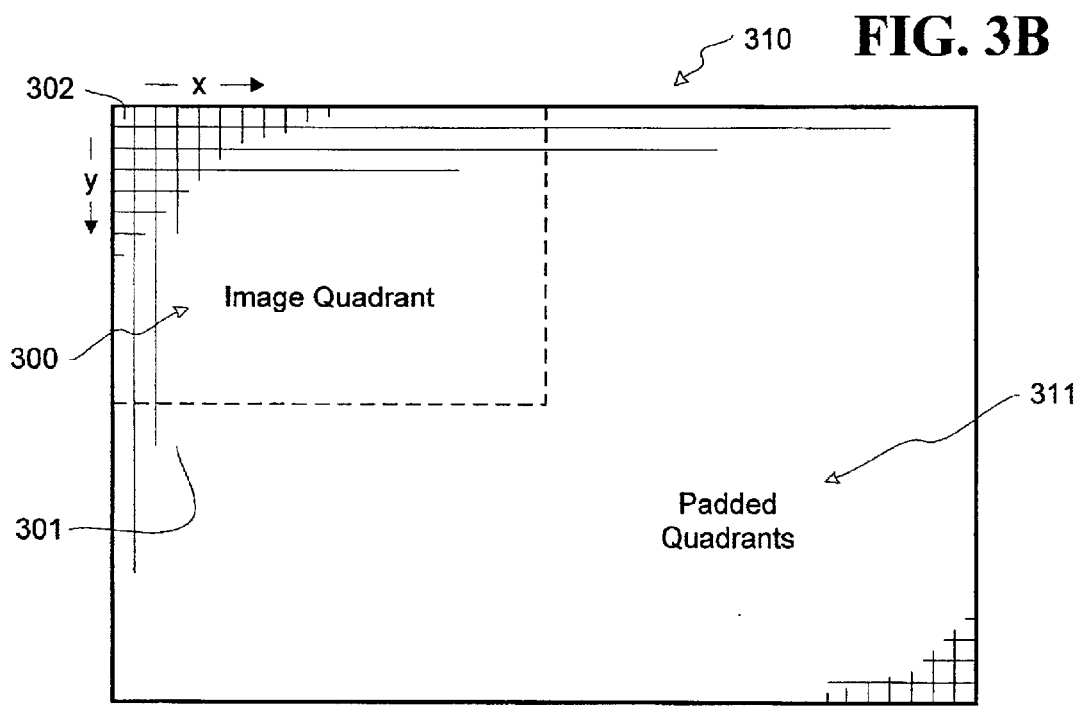
Figure 3C:
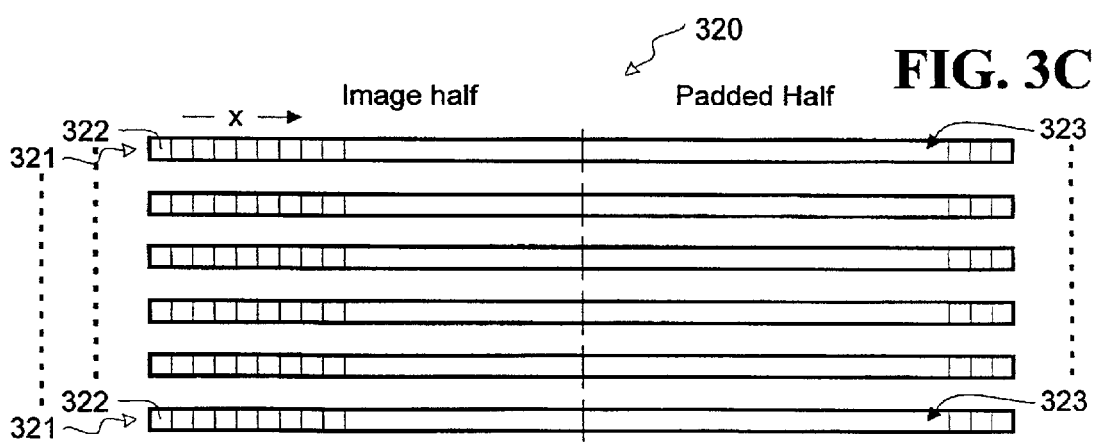

FIGS. 3A–C represent image data layouts for FIG. 2.

Figure 4:
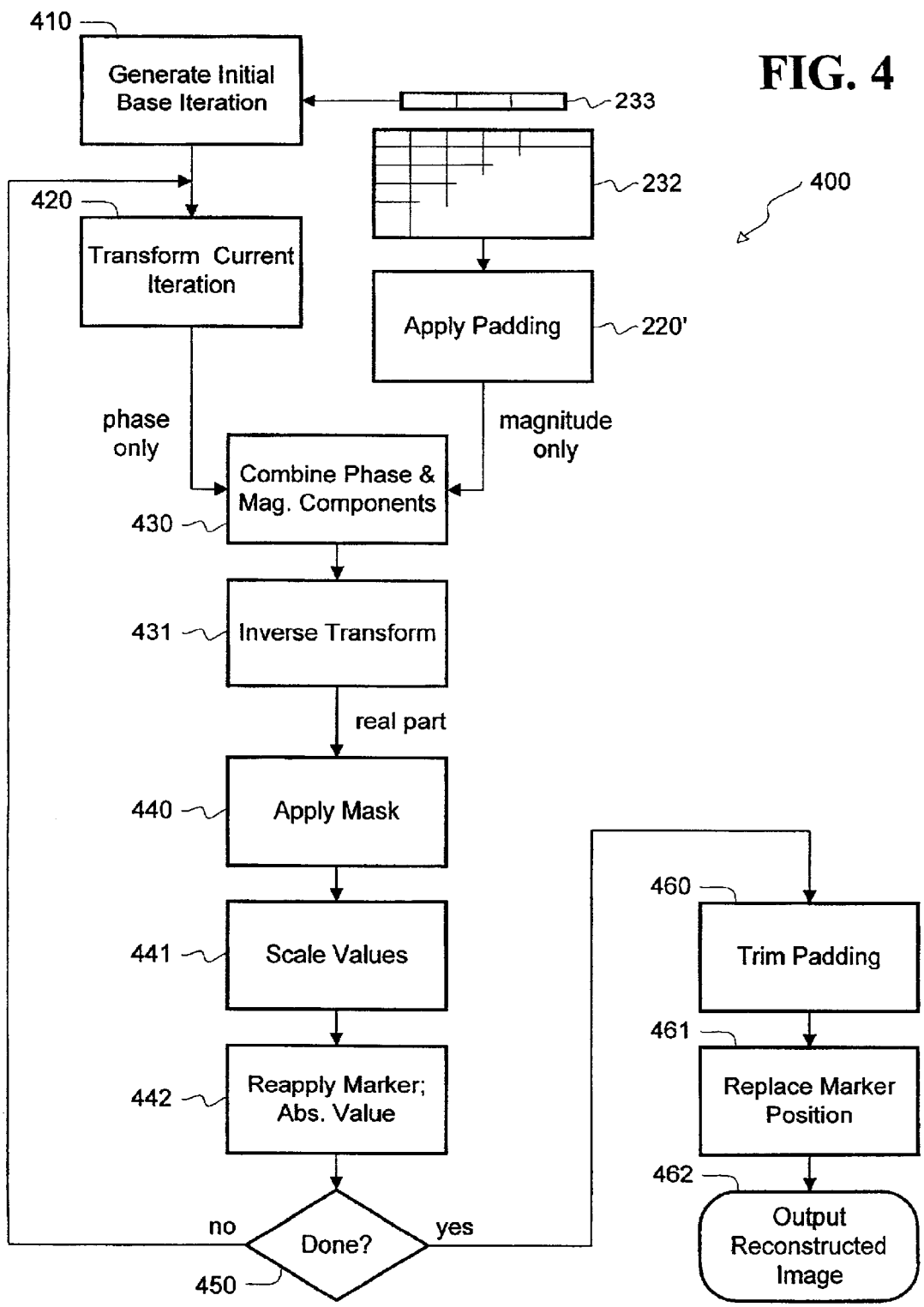

FIG. 4 outlines a method for restoring an image.

Figure 5:
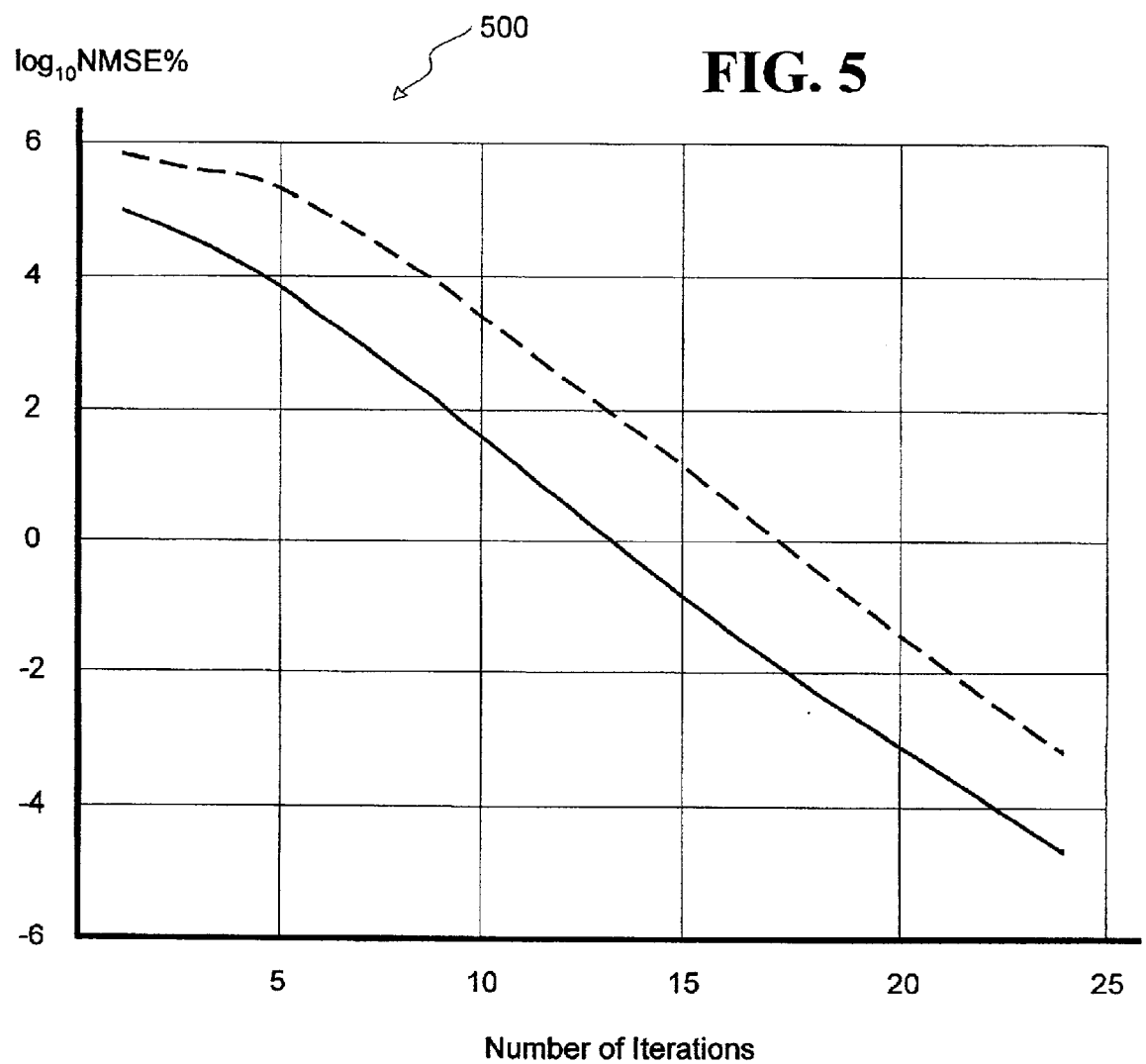

FIG. 5 is a graph illustrating convergence of a restoration method.

FIG. 6 shows how to prepare transformed component image data for restoration.

The following description and the drawing figures describe some specific embodiments of the invention sufficiently to enable those skilled in the art to practice it. Alternative embodiments may incorporate structural, logical, process, and other changes. Examples merely typify possible variations. Individual structures and functions are optional unless explicitly required, and the relative sequence of operations may vary. Portions and features of some embodiments may be included in or substituted for those of others. The scope of the invention encompasses the full ambit of the appended claims and all available equivalents.

Operation

The following nomenclature is used for illustrating a two-dimensional image $I(n_1,n_2)$, where $n_1$ and $n_2$ are Cartesian pixel indices, and $k_1$ and $k_2$ are Cartesian indices for a two-dimensional discrete Fourier transform (DFT) $IF(k_1, k_2)$.

| | |
|---|---|
| $I(n_1,n_2)$ | is the original ($N_1 \times N_2$) image. |
| $IF(k_1,k_2)$ | is the ($N_1 \times N_2$) DFT of the original image $I(n_1,n_2)$. |
| $II(n_1,n_2)$ | is the padded ($2 N_1 \times 2 N_2$) image, where $I(n_1,n_2)$ is the upper left quadrant of the padded image matrix. |
| $IIF(k_1,k_2)$ | is the ($2 N_1 \times 2 N_2$) DFT of the padded image $II(n_1,n_2)$. |
| $JJ(n_1,n_2)$ | is a padded ($2 N_1 \times 2 N_2$) image used during the iterations. |
| $JJF(k_1,k_2)$ | is the ($2 N_1 \times 2 N_2$) DFT of the padded iteration $JJ(n_1,n_2)$. |

Some images, such as MRI images, are directly available for viewing at the data source, since both the magnitude and phase components are present in the frequency transformed source data, although the invention permits storing only the magnitude component, slicing the storage requirement by 50%.

A pixel marker $I_{max}$ can be embedded in the original image $I(n_1,n_2)$ before its DFT $IF(k_1,k_2)$ is computed. The pixel marker can also be embedded directly in the magnitude component-and must be, where only that component is available. In these cases, a pixel value embedded in an ($N_1 \times N_2$) matrix of zeros is transformed and its transform is added to the magnitude component of the source data. The value of $I_{max}$ is typically more than twice the value of the sum of all the pixels in the original image $I(n_1,n_2)$. The location of the pixel marker could, for example, be in any of the four corners of the original image. The location and the value of the pixel marker follow a user-defined convention. The purpose of the marker is to enforce convergence in the magnitude-only image restoration algorithm regardless of the characteristics of the original image.

The unpadded DFT magnitude component of $IF(k_1,k_2)$, with the embedded pixel marker, is converted to a padded magnitude component of $IIF(k_1,k_2)$. Padding provides a bounded support for the image function. This is the complete DFT magnitude response, called $MIIF(k_1,k_2)$, for the algorithm for the phase restoration.

With the proper DFT magnitude response $MIIF(k_1,k_2)$ available, the magnitude-only restoration method can be invoked. A $(2\ N_1 \times 2\ N_2)$-point mask matrix $Mask(n_1,n_2)$ has all '1' values in the upper left quadrant. The remaining mask entries are all '0'. By convention, the marker location and its original image range $[min(I),max(I)]$, and the number of iterations Q are provided. The initial iterated padded image $JJ(n_1,n_2)$ is set equal to $Mask(n_1,n_2)$. The 2D DFT $JJF(k_1,k_2)$ of the iterated padded image $JJ(n_1,n_2)$ is computed, and the 2D DFT phase component $PJJF(k_1,k_2)$ is extracted. A complex array-multiplication, $JJF=MIIF*exp(j*PJJF)$, combines the two transform components. The real part of the inverse DFT of JJF is calculated to obtain a new iterated padded image $JJ(n_1,n_2)$. $Mask(n_1,n_2)$ is then array-multiplied with the iterated padded image $JJ(n_1,n_2)$ such that $JJ=Mask*JJ$. The iterated padded image $JJ(n_1,n_2)$ is scaled via the equation $JJ=J_{max}*(JJ-min(I)/max(JJ)+min(JJ)$, where $max(JJ)$ is the maximum pixel value in the iterated padded image JJ, and $min(JJ)$ is the minimum pixel value in the iterated padded image $JJ(n_1,n_2)$. The absolute value of the iterated padded image JJ is substituted, $JJ=|JJ|$. The known image marker $J_{max}=I_{max}$ is reapplied; for example, $JJ(1,1)=J_{max}$.

The iteration number q is compared to the specified total number of iterations Q. If q is less than Q, q is incremented, and the process is repeated. If q=Q, then the padded image JJ is trimmed to a $(N_1 \times N_2)$-point image J, and the image marker $J_{max}$ at, for example, $J(1,1)$, is replaced by an interpolated value $J_{11}$ of the neighboring pixel values.

For a one-dimensional sequence $x(n)$, n is the sequence index and k is the index for the one-dimensional DFT, $X(k)$.

| | |
|---|---|
| $x(n)$ | is the original N - point row or column sequence. |
| $x_1(n)$ | is the original sequence with $y_{max}$ as a preamble, $x_1(n)=[y_{max}, x(n)]$. |
| $XX_1(k)$ | is the padded $2(N+1)$ - point DFT of $x_1(n)$ where $x_1(n)$ is in the first half of the padded sequence. The rest of the entries in the $2(N+1)$ - point padded sequence $x_1(n)$ are '0'. |
| $yy(n)$ | is the padded (2 N) - point sequence used during the iteration. |
| $YY(k)$ | is the (2N) - point DFT of the padded $yy(n)$. |

The magnitude-only restoration method can also be applied to a two-dimensional image in a row-wise or a column-wise mode. Since all the pixel values within the image are non-negative, each row or column will have non-negative values. The proper DFT magnitude component MX of the one-dimensional N-point sequence $x(n)$ is computed.

Assume that row-wise restoration is being applied. Then the N-point row-sequence $x(n)$ is presented, and a marker $y_{max}$ is augmented to the sequence such that $x_1=[y_{max},x]$. The marker could also be embedded into the sequence $x(n)$, either in front or at the end of the sequence. The location and the value of the sequence marker follow a user-defined convention. The value of $y_{max}$ is typically more than twice as large as the sum of the pixels values in the row sequence $x(n)$. The $2(N+1)$-point DFT $XX_1(k)$ of the zero-padded row-sequence $x_1(n)$ is computed, and the corresponding DFT magnitude component MXX of $XX_1(k)$ is extracted.

With the proper DFT magnitude response MXX available, the magnitude-only restoration method is ready to be used. A $2(N+1)$-point mask sequence, called $Mask(n)$, having all ones in the left half of the sequence and all zeros in the remaining mask entries is generated. Also provided is, by convention, the marker location and its original row/column sequence range $[min(I),max(I)]$, and the number of iterations Q. The initial conditions for the iterated padded sequence $yy(n)$ are set equal to the $Mask(n)$. The DFT $YY(k)$ of the iterated padded sequence $yy(n)$ is computed, as well as the DFT phase PYY (in radians). The complex array product $YY=MXX*exp(j*PYY)$ is calculated from MXX and PYY. The real part of the inverse DFT of YY is calculated to obtain a new iterated padded sequence $yy(n)$. $Mask(n)$ is then array-multiplied with the new iterated padded sequence $yy(n)$, such that $yy=Mask*yy$. The iterated padded sequence $yy(n)$ is scaled via the equation $yy=y_{max}*(yy-min(yy))/max(yy)+min(yy)$, where $max(yy)$ is the maximum pixel value in the iterated padded sequence $yy(n)$, and $min(yy)$ is the minimum pixel value in the iterated padded sequence $yy(n)$. Then the absolute value of the iterated padded sequence yy is substituted, $yy=|yy|$. The sequence marker $y_{max}$ is reapplied, for example, $yy(1)=y_{max}$.

The iteration number q is compared to the specified total number of iterations Q. If q<Q, the q is incremented by one, and the process is repeated. If q=Q, the padded sequence yy is trimmed to an N-point sequence $y=yy\ (2:(N+1))$. Thus, the sequence marker $y_{max}$, for example, at $yy(1)$ is removed. The restored magnitude-only sequence $y(n)$ is finally output.

The pixel marker(s) used in the two methods anchor the solution. A pixel-marker amplification gain factor K hastens convergence of the iterative magnitude-only reconstruction. That is, $I_{max}=K*sum(I(n_1,n_2))$ and $x_{max}=K*sum(x(n))$ are significant in the convergence of the reconstruction process.

The top row and left column are then trimmed from restored image $J(n_1,n_2)$. Alternatively, the restored image $J(n_1,n_2)$ can be trimmed such that the resultant image is a $[(N1-1)\times(N2-1)]$ image.

DESCRIPTION OF EMBODIMENTS

Figure 1:
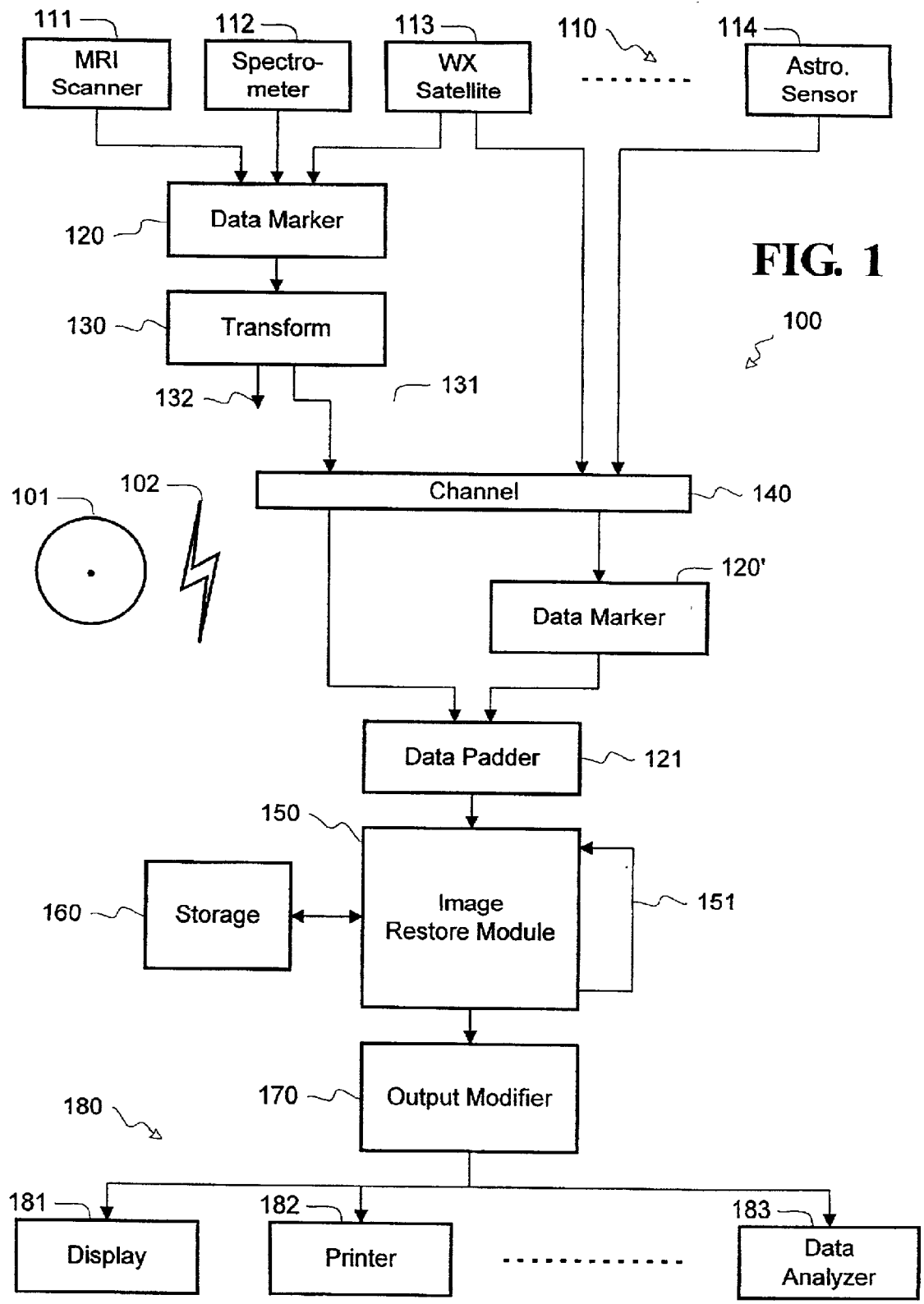
FIG. 1 illustrates an overall system for communicating an image in component form.

FIG. 1 shows an example of a system 100 for hosting the invention. The invention can be implemented in software, hardware, or any combination. A computer-readable storage or communication medium such as 101 or 102 may hold or transmit some or all of any computer instructions or data for executing the invention.

A number of different sources 110 in an input section may provide an image or other data. Some produce an original image in the base image domain such as space or time. MRI scanner 111, for example, generate data representing two-dimensional spatial images. This data may be sent on in two-dimensional form, or may be converted to one-dimensional rows or columns. Other sensors, such as spectrometer 112 may generate data that is inherently one-dimensional, having time as its base domain, and the data points corresponding to image pixels have temporal locations. Some sources may generate component data in a transform domain. Weather satellite 113 may produce both spatial images and frequency observations. Astronomical sensor 114 for a telescope is capable of outputting only one component (power or magnitude) data for different wavelengths in a frequency transform domain, and cannot determine the phase component. Other magnitude-only sensors include those for X-ray crystallography, electron microscopy, and coherence theory.

Module 120 modifies data from a base-domain source to add one or more markers for later restoration of the original image. Transform generator 130 converts the data to a transform domain, unless the image is already in that domain. Frequency-transformed data are usually stored in floating-point double-precision format. A digital signal processor may implement a discrete Fourier transform to produce frequency and phase components. However, module 130 may send only the magnitude component—or a derivative such as magnitude squared—as data 131 representing the original image. (Line 132 symbolically represents discarded complementary phase-component data.)

Channel 140 communicates the modified partial data 131 from any of the sources 110 to be restored directly, or stores it for later restoration. Communication may take the form of direct transmission from one physical location to another over a medium such as 101, or of storage in a medium such as 102. Medium 102 may temporary or archival, and may occur at any physical location or facility.

Image data that has already passed through marker module 120 can pass directly to a module 121 that further modifies the image by inserting padding into it in the transform domain. Padding could have been inserted into the image in the base domain before transmission or storage in channel 140. However, padding increases the image size, and may significantly increase the storage size or transmission time required for the transformed partial data. Although padding can be inserted at any point, many applications favor performing this operation after storage or transmission in the transform domain.

For unmodified transform data from a source such as 114, module 120' marks the data in the transform domain before passing it to padding module 121. Because it does not significantly increase the size of the transform data, transform-domain marking may occur before or after storage or transmission in channel 140. Data from sources 111–113 could alternatively be marked in the transform domain by a module such as 120', instead of being marked in the base domain before transformation. Although transform-domain marking involves direct manipulation of the transform-domain image, such marking has a corresponding representation in the base image domain, and will sometimes be described from that viewpoint.

Restore module 150 calculates complementary component data from the current iterated approximation, combines it with the received transformed component data, and takes an inverse transform to convert the data to the base domain of the original image. Line 151 represents iteration through the module. Module 150 reinserts the known marker value (s) and padding at the correct locations in the image data during every iteration, so as to coerce convergence toward the correct image. It may also scale or otherwise manipulate the iteration data. Storage 160 holds the transformed image from channel 140, and initial and interim data representing the iterated restored image. It may also hold parameters such as markers and pad locations.

Output modifier 170 performs ancillary operations upon base-domain data representing the final iteration of the restored image. These operations may include scaling or normalizing data values, trimming away padding, and interpolating pixel values. The final restored image then proceeds to various output devices 180 such as displays 181, printers 182, and data analyzers 183 for presentation to a user or for further processing.

FIG. 2 outlines one of the methods for modifying original image data for communication and restoration. Modules such as 120, 120', and/or 130, FIG. 1, may implement method 200. Block 201 receives an original image 300, FIG. 3A, in the form of a large number of pixels 301 or other data points each representing an intensity or other characteristic at a certain location in the image. FIG. 3A depicts Image 300 as a two-dimensional (2D) spatial image having pixel locations designated by x and y coordinates. Image 300 may be treated as a two-dimensional image. Alternatively, its rows or columns may be operated upon separately as a sequence of one-dimensional (1D) images; this may simplify implementing the calculations in an integrated circuit. The spatial form of the image is the base domain of the image in this example.

Operation 210 sets a marker value, from characteristics of the image data. In this example, the marker value may be selected as a constant K times the sum of all the pixels values in a 2D restoration, or the sum of all pixel values in a row or a column for a 1D restoration. Setting K>1 insures that the resulting transformed data sequence is characteristically minimum-phase. Higher values, typically around 2.0 to 2.5, act as a gain factor to speed up the convergence of the subsequent restoration of the image and decrease errors in the restored image. If all of the pixel values are zero in a row or column, then the marker value can be set to any convenient value that is larger than zero, for a 1D restoration. Instead of measuring and summing actual pixel values, the marker may be set to ensure the desired result; e.g., for a 64-pixel 1D image row having 8-bit pixels, a marker exceeding 64×256=16384 is necessarily greater than the sum of all actual pixels in that row.

Block 211 applies the calculated marker value to image 300. In this case, the value is placed within the image by substituting it for a pixel 302 at a predetermined location such as x=0, y=0. Although the marker represents one or more designated image locations, it can physically be inserted anywhere, added as further pixel locations, sent separately from the image, or be made known to the system in some other way. Some situations may employ multiple marker values and/or locations. For example, some high-contrast images may restore more easily when a normal marker pixel value is followed by another marker pixel having a '0' value. These two markers may be added as, e.g., a preamble to each row or column of a 1D image.

Operation 220 applies padding to provide a bounded support for image 300. FIG. 3B shows the original image 300 embedded in one quadrant of a modified image 310, FIG. 3B. The other three quadrants 311 have pixels 312 with predetermined values, conveniently all zeros. There are other ways to provide appropriate mathematical support for the present purposes. FIG. 3C shows another format for a modified image. Image 320 represents each row (x=constant, $0 \leq y=Y$) of image 300 as a separate one-dimensional stream of image data fields 321. Each stream may contain its own marker 322 and its own one-dimensional padding 323 as an appended sequence of known pixel values. This example appends a number of zeros equal to the number of data pixels in the row. A single marked and padded row can alternatively represent an entire one-dimensional image. Other image formats can be accommodated as well. Some environments gain an advantage by applying the padding after conversion to the transform domain, perhaps at the physical location of the restoration process. The purpose of the padding is to provide mathematical support for bounding the image. Any operation that achieves this end may serve in block 220; in some cases, the original image may already possess a border or other area that makes it unnecessary to add further padding.

Operation 230 applies a transform to the padded and marked image. A two-dimensional image format such as 310 may employ a two-dimensional transform. A one-dimensional image such as 320 may use a separate one-dimensional transform for each row 321, or a single one-dimensional transform that aggregates all the rows together as a single data sequence. This example supposes a discrete Fourier transform (DFT). Other forms of Fourier transform, and transforms other than Fourier, may also be suitable.

The DFT and other such transforms produce multiple separable components. The DFT generates complementary sets of coefficient data representing magnitudes and phases. These components are separable; that is, either may be stored or processed independently of the other. Operation 231 selects less than all components of the transformed image data as the transform-domain representation of the image—in this illustration, only the magnitude component. Operation 231 may also perform functions such as scaling to remove negative data values from the original image, or selecting only the most significant portion of the magnitude coefficients for communication. Matrix 232 symbolizes the output data stream of transform-domain data for the image. Block 233 symbolizes ancillary data that might or might not be sent with the image data, including a header and image parameters such as values or locations for the marker(s) or padding.

FIG. 4 implements one of a number of methods for restoring a modified image from only a component of data in a transform domain. Software or hardware modules 150–160, FIG. 1, may carry out method 400. In the context of images represented by the magnitude component of Fourier-transformed data, method 400 can be thought of as a phase-retrieval process; that is, it regenerates the missing phase component.

As noted in connection with FIG. 2, padding is sometimes preferably applied to the image in the transform domain, rather than in the base domain. Padding usually increases the size of the image in the transform domain as well as in the base domain, requiring extra storage space and/or communication time for the transform-magnitude representation of the image in channel 140, FIG. 1. In such applications, padding can be delayed until the reconstruction of the image. Block 220' in FIG. 4 performs this operation in process 400 whenever it has not already been performed as a part of process 200, or as a part of process 600, FIG. 6. Example methods for creating desired base-domain padding by manipulations in the transform domain will be described for process 600, FIG. 6.

Operation 410 generates a mask as an initial iteration of a padded image in the base domain of the image. This example supposes a spatial base domain in a two-dimensional format such as image 310, FIG. 3A. A convenient mask assigns a '1' value to each pixel at the locations of the original unpadded image. The padded areas contain the known pad values at the known locations of the padding. The marker location contains the known marker value, possibly received from data 232; e.g., if method 200 had applied a marker value of $2^{18}$ at location {0,0} of the original image, then block 410 sets mask location {0,0} to $2^{18}$. Parameters such as image size, pad values and locations, and marker value and location can be obtained from transmitted data 233 or provided to the method in any other convenient manner.

Operation 420 transforms the padded and marked iteration to the transform domain, e.g., to magnitude and phase components in the frequency domain. The magnitude component, however, is discarded. The first iteration is the mask from block 410; subsequent iterations arrive from block 450.

Operation 430 receives the phase component of the transformed iteration, and combines it with the magnitude component of the transformed and modified original image. The result represents an image in the transform domain having magnitude values from the image to be restored, but having phase values from an approximation—possibly quite inaccurate—to that image. For a Fourier transform, this operation may constitute a complex multiplication $Me^{j\Phi}$ where M represents the magnitude component from received data 232 and $\phi$ is the phase component from block 420.

Operation 431 takes an inverse transform of the combined transform-domain image to produce an image iteration in the base domain having the format of 310 or 320, FIGS. 3B–C. An inverse DFT may produce complex values; block 431 selects the real parts of such values to represent the pixels of the iterated image.

Operation 440 then reinstates the known pixels of the pad areas such as 311 in FIG. 3B. For the particular mask described in connection with block 410, merely multiplying the iteration by the mask, element by element, reintroduces the pad values. The inverse transform may have generated some untoward results, such as pixels outside the permitted range of values, or negative pixels. Block 441 scales the pixel data from block 440 into a desired form for further processing. Scaling functions may include renormalizing the magnitude range, translating the levels up or down, and taking absolute values. Block 442 inserts the known marker value(s) at the predetermined known location(s) in the base-domain version of the iterated restored image. Block 442 could alternatively recompute the marker value, e.g., by multiplying the known constant K times the sum of all the pixels values in the data from block 441. The absolute value of the scaled values from block 441 can be calculated after the marker is applied in block 442, as well as before.

Block 450 determines whether or not the current iteration is the final one. Many conditions are appropriate, including simply a fixed number of iterations. If the end condition is not met, line 451 returns control to block 411, using the output of operation 442 as the next iteration of the restored image. Many images converge sufficiently after 15 to 20 iterations.

Every iteration of method 400 corrects the base-domain image with known data values at certain locations. With a suitably chosen marker value, replacing the marker location with its known fixed value repeatedly during the iterations anchors the process, ensuring that the iterated restored image will in fact converge regardless of any special conditions or characteristics of the original image. The padding provides functional support for the image field, if required.

Operation 460 trims the padding from the final iteration of the base-domain image, converting it back to the format of the original. For an image such as 310, block 460 strips off the pad locations 311, leaving the image field 300. Other formats such as 320 strip pad areas 323 in a similar manner. Inserting a marker value into the transmitted image obliterates the original value of the pixel at the marker location. Operation 461 replaces that pixel with a value hopefully more nearly approaching that of the original image. In this example, block 461 averages the values of pixels near the marker location and replaces that pixel with the interpolated value. A simple interpolation averages the values of the pixels surrounding the marker location. Under some conditions, interpolation of the marker bit may interfere with convergence. For a marker pixel 302 at location [0,0] in FIG. 3A or FIG. 3B, operation 461 could trim row x=0 and column y=0 from the restored image produced in FIG. 4, thus removing the marker position from the final image and eliminating this artefact. Alternatively, the original image 310 could have been augmented by a row of pixels at the top and a column at the left side, then the restored image trimmed to remove them.

Block 462 outputs the restored image in its base domain for further manipulation or storage.

Method 400 pertains to images in other formats, such as 320, FIG. 3C. Converting a two-dimensional image to a sequence of one-dimensional row or column data in the base domain may reduce computation time and storage space during restoration, and may facilitate implementation in an integrated circuit. Again, methods 200 and 400 are broadly useful for images in any format, and for data other than spatial images. Manipulation of the image in the base domain is transparent to restoration according to the invention. For example, the original image 300, FIG. 3A, could have been compressed by any of a number of conventional algorithms. When the image is later restored, applying an inverse algorithm at block 462 recovers the original image in uncompressed form.

Listings I and II, below, contain code in the Matlab® programming language, available from The MathWorks, Inc. Listing I implements a routine for restoring a two-dimensional image such as 320, FIG. 3B. Listing II illustrates a routine for restoring one-dimensional data such as one of the rows 321 of image 320, FIG. 3C. The function names fft2 and fft1 respectively represent two-dimensional and one-dimensional discrete fast Fourier transforms.

FIG. 5 demonstrates the performance of method 400, FIG. 4, in restoring a representative image. The abscissa of graph 500 denotes number of iterations. The ordinate is calibrated in terms of the base-10 logarithm of percentage normalized mean squared error (NMSE). A common measure of image quality, NMSE sums over all pixels the square of the difference between each pixel in an original image and the corresponding pixel in the restored image, and divides the result by the sum over all pixels of the square of each pixel in the original image. Smaller NMSE values indicate more accurate restoration.

FIG. 5 demonstrates two convergence performance curves of method 400, FIG. 4, in restoring two representative images. The abscissa of graph 500 denotes number of iterations. The ordinate is calibrated in terms of the base-10 logarithm of percentage normalized mean squared error (NMSE). A common measure of image quality, NMSE takes the variance of the difference between each pixel in an original image and the corresponding pixel in the restored image, and divides the result by the variance over all pixels in the original image. Smaller NMSE values indicate more accurate restoration. The curves indicate that the convergence rates, i.e., NMSE per iteration, are similar for both images.

FIG. 6 illustrates an alternative method for modifying an image for restoration by a method such as 400, FIG. 4. In some cases, the nature of the sensor precludes modifying the original image in the base domain, ruling out a modification process similar to 200, FIG. 2. Sensor 114, FIG. 1, offers an example. Even when both components of a transformed image or other signal are available, some applications may severely distort one component, leaving reliable data only in the other component. For example, blind convolution attempts to restore data from an unknown signal convolved with noise or filtered through an unknown system. In other environments, the base and/or complete transformed image data may be available and satisfactory, but there are no convenient facilities to modify it prior to transforming and sending it.

Method 600 modifies a transform magnitude component of an image directly in the transform domain, instead of modifying a base-domain image first and then transforming it as in method 200. This method is employed when the image is not available in base-domain form; however, it may also be employed when the base-domain image is available but had not been marked for some reason. Block 601 receives the available component of an arbitrary image or other data in a transform domain. This example employs a magnitude component of a Fourier transform of a two-dimensional image.

Block 610 selects a marker value. This base-domain value may be the same as for block 210, FIG. 2, although it must be calculated from the transformed image in this case. For a 2D image, the $\{k_1=0, k_2=0\}$ data value of the transformed image magnitude, i.e., the zero-frequency (k=0) or DC coefficient, is equal to the sum of the pixel values in the base-domain image. For a 1D representation, the DC data value of the transformed magnitude of a row or column of the image is equal to the sum of the pixels in the same row or column of the base-domain image. Accordingly, the marker value becomes $J_{max}=K*IF(0,0)$ for the 2D case, and $y_{max}=K*XX(0)$ for the 1D case. K may have the same ranges as for operation 210, FIG. 2. Block 611 inserts the marker. The base-domain marker value from block 610 may be converted to the transform domain and inserted into the magnitude data at an appropriate pixel location. For example, the base-domain value can be represented as a high-valued delta function at the marker location. This can be implemented by adding the argument value of the delta function to each of the components of the image data in the transform domain, in block 211, FIG. 2. Alternatively, the marker may be sent in base-domain form as separate data 233. Calculating and inserting the marker may occur when and where the image data is generated, or at the time and location that the image is reconstructed. Although inserting the marker is usually easier in the base domain when the original image is available in that domain, the marker could be inserted in the transform domain in that case as well, if desired.

Block 620 applies padding to the transform component directly in the transform domain by adding a value to each of the magnitude coefficients in the transform domain. This is an approximation that produces a negligible error in the reconstruction. One way to add known padding values at known locations in the base domain of a one-dimensional image sequence such as 320, FIG. 3C, is to catenate the magnitude component of a Fourier transform to itself. This forces alternate pixel locations in the base image domain to a '0' value. These locations then become the padding. Folding the component coefficients to create a symmetry is another example of a way to introduce padding directly in the transform domain. Operation 460, FIG. 4 can easily accommodate stripping such locations from the restored image. Similar techniques exist for other data formats.

Method 800 outputs the same image data 232 as does method 200, FIG. 2. Ancillary data 233 may be generated as well in some cases.

CONCLUSION

The above description presents restoration methods and apparatus for one- and two-dimensional images whose base domain is a set of spatial pixels, and whose transform domain represents frequency coefficients of a discrete Fourier series. Because many different kinds of data can be restored in substantially the same way, the terms "image,"

"base domain," and "spatial" must be taken broadly. The term "transform domain" also extends beyond the example of Fourier transforms having magnitude and phase components. The term "component" can encompass any one of multiple separable data sets arising from a transform; a "complementary component" is one which, together with another component, totally represent the base-domain image in the chosen transform domain.

LISTING I

```
function J = mag_only2(I, Q, Irange)
%MAG_ONLY2        Two-dimensional magnitude-only
%                 reconstruction
%
%        INPUT
%                 I = 2D sequence (image)
%                 Q = number of iterations
%                 Irange = [Imin, Imax], eg., Irange = (0 255)
%
%        SYNTAX
%                 J = mag_only3(I, Q, Irange);
%
I = double(I);
Imin = min(I(:)); Imax = max(I(:));
Jmax = 2.3*sum(I(:));              % Generation of marker
value
[N1, N2] = size(I);
II = I;
II(1, 1) = Jmax;                   % Planting the marker in
                                   % the image
IM2 = abs(fft2(II, 2*N1, 2*N2));   % Known magnitude
                                   % with marker
mask = [ones(N1, N2), zeros(N1, N2); zeros(N1, 2*N2)];
JJ = mask;                         % Initial condition
for ii = 1:Q
    JJX = fft2 (JJ)
    JP2 = angle(JJX);              % Phase in radians
    JJX = IM2.*exp(j*JP2);         % Compose new XJ
    JJ = real(ifft2(JJX));
    JJ = mask.*JJ;                 % Apply the mask
    % Scaling the resultant image
    JJ = Jmax*(JJ–Imin)/max(JJ(:)) +min(JJ(:));
    JJ = mask.*JJ;                 % Re-applying the mask
    JJ(1, 1) = Jmax;               % Re-enforcing the marker
    JJ = abs(JJ);                  % Insuring no negative
                                   % pixel values
end
J = JJ(1:N1, 1:N2);
J(1, 1) = 0;                       % Getting rid of the
                                   % marker
J11 = J(1:3, 1:3);                 % Selecting the 3 x 3
                                   % upper left corner
J11 = 9*mean(J11(:))/8;            % Interpolation of (1, 1)-
                                   % element
J(1, 1) = J11;
```

LISTING II

```
function         y = mag_only_1(x, Q, xrange)
%MAG_ONLY1A      One-dimensional magnitude-only
%                reconstruction
%
%        INPUT
%                x = 1D sequence
%                Q = number of iterations
%                xrange = [I_min, I_max], two elements
%
%        SYNTAX
%                I = mag_only1(x, Q, xrange);
%
ymax = 2.3 *sum(x);                % Generation of marker value
x = [ymax, x];                     % Marker as pre-amble
```

-continued

LISTING II

```
N = length(x);
mag = abs(fft(x, 2*N));            % Known 2(N+1) -point DFT
                                   % magnitude with marker
mask = [ones(1, N), zeros(1, N)];
y = mask;                          % Initial condition
for ii = 1:Q
    Y = fft(y);
    Y = mag.*exp(j*angle(Y));      % Compose new Y
    y = real(ifft(Y));
    y = mask, *y;                  % Apply the mask
    % Scaling the resultant y
    y = ymax*(y-xrange(1))/max(y)+xrange(1);
    %y = mask.*y                   % Re-apply the mask
    y(1) = ymax;                   % Re-enforce the marker
    y = abs(y) ;                   % Insuring no negative
                                   % sequence values
end
y = y(2:N);                        % The reconstructed
                                   % sequence, less marker
```

What is claimed is:

1. A system for processing an original image, comprising:
   a data modifier for inserting known data at one or more known locations of the image data in a base domain;
   a channel for communicating the original image as a certain component which constitutes less than all of multiple components in a transform domain;
   a storage for holding a plurality of iterated base-domain restored images, including an initial base-domain restored image containing the known data at the known location(s);
   a restore module for producing the iterated restored images by forming a combination of the certain component of the communicated image with a complementary component of a transform of the initial and previous ones of the iterated images, and by reapplying the known marker data to an inverse transform of the combination.

2. The system of claim 1 where the data modifier inserts a known marker having a value related to a sum of the image data.

3. The system of claim 2 where the data modifier inserts the marker directly in the base domain.

4. The system of claim 2 where the data modifier manipulates the transform domain of the image to insert the marker.

5. The system of claim 1 where the data modifier adds known padding data to the image data.

6. The system of claim 5 where the data modifier adds the padding data directly in the base domain.

7. The system of claim 1 where the channel transmits the original image from one physical location to another.

8. The system of claim 1 where the channel stores the original image for subsequent restoration.

9. The system of claim 1 further comprising at least one input sensor for producing the original image.

10. The system of claim 9 where the sensor produces the original image in the base domain.

11. The system of claim 9 where the sensor produces the original image directly in the transform domain.

12. The system of claim 1 further including an output modifier for manipulating the restored image in the base domain.

13. The system of claim 1 further including at least one output device for further processing the iterated restored images.

14. A system for processing image data representing an original image in a base domain, comprising:

a data modifier for inserting known marker data at one or more selected image-data locations of the image in the base domain so as to modify the image data at the selected locations;

a transform module for transforming the original image including the modified image data to less than all of a set of complementary components in a transform domain.

15. The system of claim 14 where the value of the marker data exceeds the value of a sum of data values in the original image.

16. The system of claim 15 where
the data modifier precedes the transform module,
the data modifier inserts the marker data directly in the base domain.

17. The system of claim 15 where
the transform module precedes the data modifier,
the data modifier manipulates at least one of the complementary components in the transform domain so as to insert the marker data.

18. The system of claim 14 where the data modifier inserts known padding data at known padding locations of the image in the base domain.

19. The system of claim 14 further comprising at least one input sensor.

20. The system of claim 14 where the transform domain comprises complementary magnitude and phase components.

21. The system of claim 20 where the transform domain is a Fourier transform domain.

22. A system for processing an original image in a transform domain, comprising:
a sensor for producing only one component of multiple complementary components in a transform domain;
a data modifier for inserting known marker data at one or more known marker locations of the image in a base domain, where
the original image has a zero-frequency component,
the marker value exceeds the zero-frequency component.

23. The system of claim 22 where the data modifier manipulates the original image entirely in the transform domain so as to insert the marker data at the known base-domain location.

24. A system for processing an original image in a transform domain, comprising:
a sensor for producing only one component of multiple complementary components in a transform domain;
a data modifier for combining a known marker value with at least one of the data values in the one component of the original image so as to modify the at least one data value in the image itself;
a padding module for inserting padding data into the original image corresponding to known locations in the base domain of the original image.

25. The system of claim 24 where the padding module manipulates the original image entirely in the transform domain so as to insert the padding data at the known base-domain locations.

26. A system for processing a communicated image represented as less than all components of a transform domain, comprising:
a storage for holding an initial restored image in a base domain, the initial restored image containing known marker data at one or more known marker location(s), and for holding a plurality of iterated base-domain restored images;

a restore module for producing the iterated restored images by forming combinations of one component of the transform-domain communicated image with a complementary transform-domain component of the initial and previous ones of the iterated images, and by repeatedly reapplying the known marker data to inverse transforms of the combinations.

27. The system of claim 26 where the transform domain includes magnitude and phase components.

28. The system of claim 27 where the transform domain is a Fourier transform.

29. The system of claim 27 where the communicated image is represented by only the magnitude component of the transform domain.

30. The system of claim 26 further including at least one output device for further processing the iterated restored images.

31. The system of claim 30 where the one output device displays one of the restored images.

32. The system of claim 30 where the output device prints one of the restored images.

33. The system of claim 26 where the restore module includes a scaling module for scaling each of the iterated restored images.

34. The system of claim 33 where the scaling module takes an absolute value of each of the iterated restored images.

35. The system of claim 26 further including an output modifier for modifying at least one of the iterated restored images.

36. The system of claim 35 where the output modifier trims predetermined portions of one of the restored images.

37. The system of claim 35 where the output modifier calculates a value for the marker location from other portions of one of the iterated restored images.

38. A method for processing an image, comprising:
marking an original image so as to contain known marker data at one or more known marker locations of the image in a base domain;
communicating the image as a certain component which constitutes less than all of multiple complementary components in a transform domain;
generating an initial restored image in the base domain partly from the known marker data and location(s);
for each of a determined number of iterations, with the initial restored image as the first of a series of restored images,
transforming the restored image to the transform domain,
combining the certain component of the communicated image with a complementary component of the transform-domain restored image;
inverse transforming the restored image to the base domain;
reapplying the known marker data at the known location(s) in the base-domain restored image.

39. A computer-readable medium holding instructions for carrying out the method of claim 38.

40. The method of claim 38 where the marker data has a value exceeding a sum of data in the image.

41. The method of claim 38 where at least one of the marker locations represents a predetermined pixel location in the base domain of the original image.

42. The method of claim 38 where
the original image is in the base domain,
the known marker data is inserted in the original image in the base domain.

43. The method of claim 38 where the known marker data is inserted in the original image directly in the transform domain.

44. The method of claim 38 where modifying the original image further includes inserting known padding data at known padding locations of the image in the base domain.

45. The method of claim 44 where the known padding data is inserted in the original image in the base domain.

46. The method of claim 44 where the known marker data is applied to the original image by manipulating a component of the original image in the transform domain.

47. A method for processing image data representing an original image in a base domain for subsequent restoration, comprising:
selecting a known marker value related to predetermined data in the original image;
placing the marker value at a known location with respect to the original image so as to modify certain of the image data in the base domain;
transforming the original image including the modified image data to a transform domain having multiple complementary components;
communicating less than all of the components as a modified image.

48. A computer-readable medium holding instructions for carrying out the method of claim 47.

49. The method of claim 48 where the original and the restored image are represented as a two-dimensional set of pixels.

50. The method of claim 48 where the original and the restored image are represented as one or more one-dimensional set of pixels.

51. The method of claim 47 where the marker value represents a value having a predetermined relationship to multiple values of data comprising the image.

52. The method of claim 51 where the marker value is determined from the sum of a set of the data values in the original image.

53. The method of claim 52 where the set includes all of the data values of the image.

54. The method of claim 52 where the set includes the data values in a row or column of the image.

55. The method of claim 52 where the marker value is a constant greater than 1 times the sum of the data values.

56. The method of claim 55 where the constant is equal to or greater than approximately 2.

57. The method of claim 56 where the constant is in the range of about 2.2 to 2.5.

58. The method of claim 47 further comprising inserting known padding data at known padding locations of the image.

59. The method of claim 58 where the padding data is inserted in the base domain of the image.

60. The method of claim 58 where the padding data is inserted in the transform domain of the image.

61. The method of claim 58 where the padding data comprise zeros.

62. A method for processing an original image in a transform domain having multiple components for subsequent restoration, comprising:
selecting a known marker value in a base domain related to predetermined data for the original image in the base domain;
manipulating the original image entirely within the transform domain so as to place data therein representing a transform of the known base-domain marker value at a known location in the base domain;
communicating less than all of the components of the manipulated image as a modified image.

63. A computer-readable medium holding instructions for carrying out the method of claim 62.

64. The method of claim 62 where the marker represents base-domain values having a predetermined relationship to multiple base-domain values of data comprising the image.

65. The method of claim 62 where the marker value exceeds a sum of the multiple data values in the base domain of the original image.

66. The method of claim 62 where the marker location represents the value of a predetermined spatial position the base domain of the original image.

67. The method of claim 66 where the spatial position lies within the original image.

68. The method of claim 62 comprising further manipulating the original image entirely within the transform domain so as to insert known padding data at known padding locations of the image in the base domain.

69. The method of claim 68 where further manipulating the original image includes catenating the original image to itself.

70. The method of claim 68 where the padding data comprise zeros in the base domain of the original image.

71. A method for restoring an image to a base domain, comprising:
receiving a modified image as one component of multiple complementary components in a transform domain, the one component containing predetermined known marker data at one or more marker locations in the base domain;
generating an initial restored image in the base domain partly from the known marker data and location(s);
for each of a number of iterations, with the initial restored image as the first of a series of restored images,
transforming the restored image to the transform domain,
combining the certain component of the communicated image with a complementary component of the transform-domain restored image;
inverse transforming the restored image to the base domain;
reapplying the known marker data at the known location(s) in the base-domain restored image;
outputting one of the series of restored images as a final image in the base domain.

72. A computer-readable medium holding instructions for carrying out the method of claim 71.

73. The method of claim 71 where the modified image further includes known padding data at known padding locations of the image in the base domain.

74. The method of claim 73 where substantially all of the padding locations have a zero value.

75. The method of claim 71 further comprising adding known padding data at known padding locations of the image in the transform domain.

76. The method of claim 75 where substantially all of the padding locations have a zero value.

77. The method of claim 75 where the padding locations alternate with data locations of the image in the base domain.

78. The method of claim 71 where the marker data represents a value having a predetermined relationship to multiple values of data comprising the image in the base domain.

79. The method of claim 78 where the marker value exceeds a sum of the multiple data values.

80. The method of claim 79 where the set includes all of the data values of the image.

81. The method of claim 79 where the set includes the data values in a row or column of the image.

82. The method of claim 79 where the marker value is a constant greater than 1 times the sum of the data values.

83. The method of claim 82 where the constant is equal to or greater than approximately 2.

84. The method of claim 82 where the constant is in the range of about 2.2 to 2.6.

85. The method of claim 71 where the marker location represents at least one predetermined spatial position the original image.

86. The method of claim 85 where the spatial position lies within the original image.

87. The method of claim 85 further comprising augmenting the original image in the base domain and locating the marker in an augmented portion of the original image.

88. The method of claim 71 further comprising
determining the marker value directly from the one component;
inserting the marker value into the one component in the transform domain.

89. The method of claim 88 where the marker value exceeds a DC data value of the component.

90. The method of claim 88 where the DC data value represents all the data values of the original image.

91. The method of claim 88 where the DC data value represents the data values of a row or column of the original image.

92. The method of claim 88 where placing the marker value comprises adding value of a delta function to each of the components of the transform-domain image.

93. The method of claim 71 further comprising scaling the restored image during each iteration.

94. The method of claim 93 where scaling occurs in the base domain after inverse transforming.

95. The method of claim 93 where scaling occurs before reapplying the known marker data.

96. The method of claim 93 where scaling renormalizes a range of data values.

97. The method of claim 93 where scaling takes an absolute value of data values.

98. The method of claim 71 further comprising trimming a portion of the restored image in the base domain.

99. The method of claim 98 where the trimmed portion represents known padding locations of the modified image.

100. The method of claim 99 where the known padding locations lie outside an image field of the restored image.

101. The method of claim 99 where the known padding locations lie at least partly inside an image field of the restored image.

102. The method of claim 98 where the trimmed portion includes the one or more marker locations.

103. The method of claim 71 further comprising replacing the marker location(s) with other data value(s).

104. The method of claim 103 where the other data value(s) represent a function of data value(s) at further location(s) in the restored image.

105. The method of claim 103 where the other data value(s) represent an average of data values at further predetermined locations in the restored image.

106. A system for processing image data representing an original image, comprising:
a marker module
for holding a marker representing a value within a range of pixel values in a base-domain version of the original image, the base-domain version having a plurality of actual pixel values at a plurality of locations, and
for applying the marker to certain of the image data representing at least one actual pixel value for at least one of the locations, so as to modify the certain image data;
a channel for communicating less than all of a plurality of complementary components representing a transform-domain version of the image data.

107. The system of claim 106 further comprising an input sensor for producing the image data directly as the base-domain version of the original image.

108. The system of claim 106 where the marker module applies the marker directly to the base-domain version at the at least one location, so as to replace the actual pixel value(s) with the marker.

109. The system of claim 106 where
the image data comprises the base-domain version;
the marker module applies the marker directly to the at least one location of the image data, so as to replace the actual pixel value(s) at the at least one location.

110. The system of claim 106 further comprising a transform module for transforming the base-domain version to the transform domain so as to produce at least one of the complementary components of the transform-domain version.

111. The system of claim 110 where the marker module inserts the marker directly into the transform-domain version so as to modify values of the image data in the transform-domain version.

112. The system of claim 111 where the marker module combines the marker with multiple values of at least one of the complementary components of the transform-domain version.

113. The system of claim 112 where the marker module adds the marker to the values of a magnitude component of the transform-domain version.

114. The system of claim 106 further comprising a sensor for producing the image data directly as at least one of the complementary components of the transform-domain version of the original image.

115. The system of claim 106 where
the image data comprises the transform-domain version;
the marker module inserts the marker directly into at least one of the complementary components of the image data.

116. The system of claim 115 where the marker module combines the marker with the values of the at least one of the complementary components of the image data.

117. The system of claim 106 where the marker is selected so as to insure that the transform-domain version is minimum-phase.

118. The system of claim 106 where the marker is selected in relation to multiple pixel values of the base-domain version.

119. The system of claim 118 where the marker is selected to represent a value exceeding a sum of the pixel values in the base-domain version.

120. The system of claim 106 where only a single one of the complementary components is communicated.

121. The system of claim 106 where the channel stores less than all of the plurality of complementary components.

122. The system of claim 106 where the channel transmits less than all of the plurality of complementary components.

123. The system of claim 106 further comprising at least one input sensor for producing the image data.

124. A method comprising:

receiving image data representing an original image;

accessing a marker representing a value within a range of pixel values in a base-domain version of the original image, the base-domain version having a plurality of actual pixel values at a plurality of locations;

applying the marker to certain of the image data representing the at least one actual pixel value for at least one of the locations;

communicating less than all of a plurality of a plurality of complementary components representing a transform-domain version of the image data.

125. The method of claim 124 comprising substituting the marker value(s) directly into the base-domain version at the at least one location, so as to replace the actual pixel value(s) with the marker.

126. The method of claim 124 where the image data comprises the base-domain version;

the marker is substituted directly into the at least one location of the image data, so as to replace the actual pixel value(s) at the at least one location.

127. The method of claim 124 further comprising transforming the base-domain version to the transform domain so as to produce the transform-domain version.

128. The method of claim 127 where the marker is substituted directly into the transform-domain version.

129. The method of claim 128 where the marker is combined directly with multiple values of at least one of the complementary components of the transform-domain version.

130. The method of claim 124 where the image data comprises the transform-domain version;

the marker is substituted directly into at least one of the complementary components of the image data.

131. The method of claim 136 where the marker is combined with the values of the at least one complementary component of the image data.

132. The method of claim 124 where the marker is selected so as to insure that the transform-domain version is minimum-phase.

133. The method of claim 124 where the marker is selected in relation to multiple pixel values of the base-domain version.

134. The method of claim 133 where the marker is selected to represent a value exceeding a sum of the pixel values in the base-domain version.

135. The method of claim 124 where only a single one of the complementary components is communicated.

136. The method of claim 124 where communicating includes storing less than all of the plurality of complementary components.

137. The method of claim 124 where communicating includes transmitting less than all of the plurality of complementary components.

138. A computer-readable medium holding instructions for carrying out the method of claim 124.

* * * * *

UNITED STATES PATENT AND TRADEMARK OFFICE
CERTIFICATE OF CORRECTION

PATENT NO. : 6,873,744 B2
DATED : March 29, 2005
INVENTOR(S) : Ottesen

It is certified that error appears in the above-identified patent and that said Letters Patent is hereby corrected as shown below:

Column 15,
Line 47, delete "claim 56" and insert -- claim 55 --, therefor.

Column 16,
Line 8, delete "claim 62" and insert -- claim 64 --, therefor.

Column 20,
Line 6, delete "claim 136" and insert -- claim 130 --, therefor.

Signed and Sealed this

Thirty-first Day of May, 2005

JON W. DUDAS
*Director of the United States Patent and Trademark Office*